(12) United States Patent
Nagatoshi

(10) Patent No.: US 11,415,784 B2
(45) Date of Patent: Aug. 16, 2022

(54) IMAGAING OPTICAL SYSTEM, PROJECTION DISPLAY DEVICE, AND IMAGING APPARATUS

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 492 days.

(21) Appl. No.: 16/578,619

(22) Filed: Sep. 23, 2019

(65) Prior Publication Data

US 2020/0096750 A1    Mar. 26, 2020

(30) Foreign Application Priority Data

Sep. 25, 2018  (JP) .............................. JP2018-179427
Feb. 7, 2019   (JP) .............................. JP2019-021043

(51) Int. Cl.
G02B 15/14    (2006.01)
H04N 5/225    (2006.01)
G03B 17/14    (2021.01)
G02B 27/18    (2006.01)
G02B 19/00    (2006.01)

(52) U.S. Cl.
CPC ........... *G02B 15/142* (2019.08); *G03B 17/14* (2013.01); *H04N 5/2254* (2013.01); *G02B 19/0004* (2013.01); *G02B 27/18* (2013.01)

(58) Field of Classification Search
CPC .............. G02B 15/142; G02B 19/0004; G02B 27/0025; G02B 27/18; G03B 17/14; H04N 5/2254
See application file for complete search history.

(56) References Cited

U.S. PATENT DOCUMENTS 7,233,448 B2 *  6/2007  Imamura ........ G02B 15/144511
                                                  359/686

FOREIGN PATENT DOCUMENTS

JP    2016-142883 A    8/2016
JP    2018-205332 A    12/2018

* cited by examiner

*Primary Examiner* — Joseph P Martinez
*Assistant Examiner* — Vipin Patel
(74) *Attorney, Agent, or Firm* — Studebaker & Brackett PC

(57) ABSTRACT

An imaging optical system includes a plurality of lenses, and the plurality of lenses includes a lens pair consisting of two lenses arranged near each other, in which radii of curvature of two surfaces arranged near each other is close to each other, and which satisfies predetermined conditional expressions.

15 Claims, 10 Drawing Sheets

EXAMPLE 1

FIG. 1
EXAMPLE 1
WIDE-ANGLE END
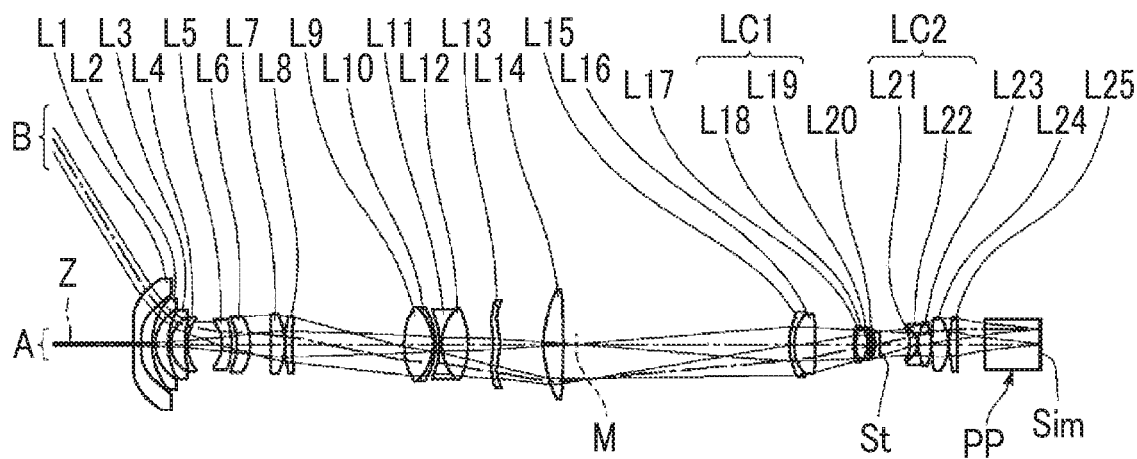
TELEPHOTO END
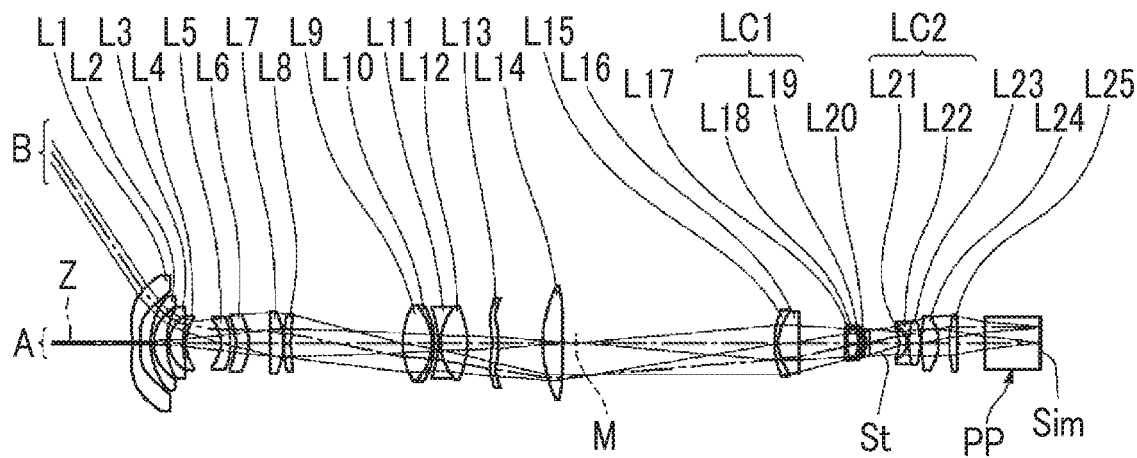

EXAMPLE 2

EXAMPLE 3

FIG. 4
EXAMPLE 4
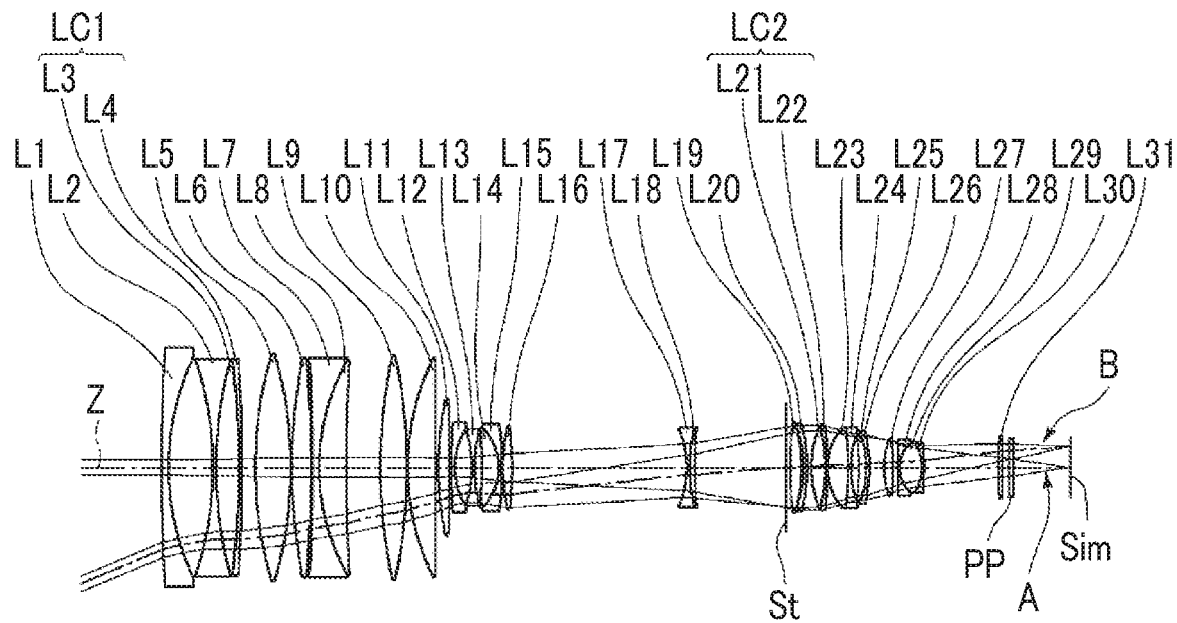
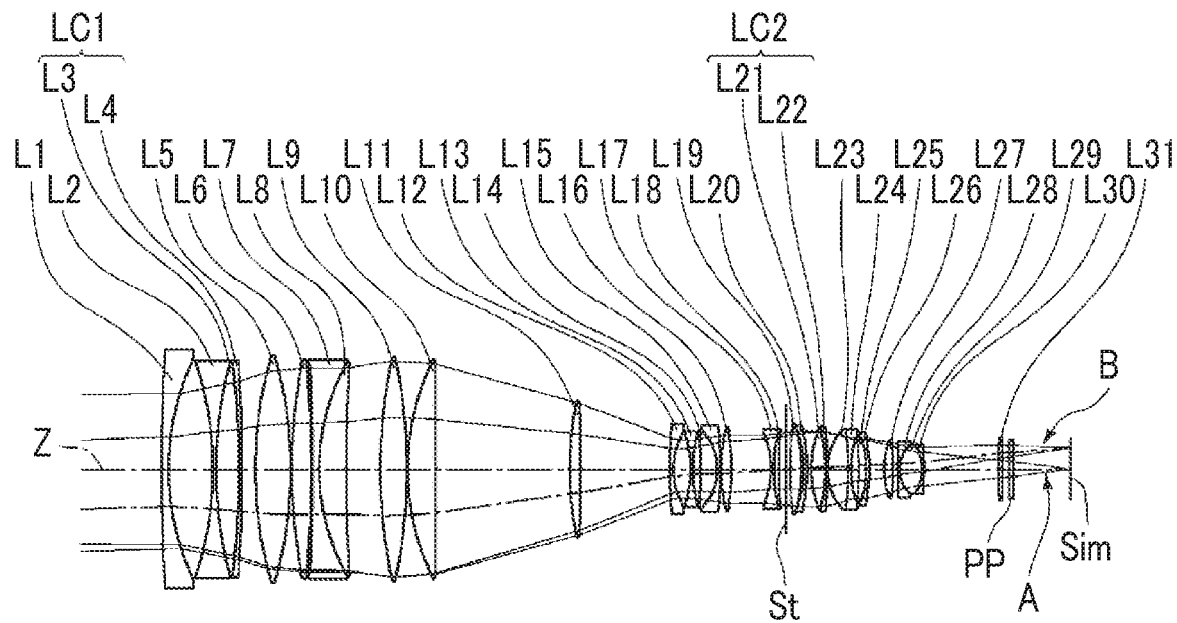

IMAGAING OPTICAL SYSTEM, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2018-179427 filed on Sep. 25, 2018, and Japanese Patent Application No. 2019-021043 filed on Feb. 7, 2019. The above applications are hereby expressly incorporated by reference, in its entirety, into the present application.

BACKGROUND OF THE INVENTION

1. Field of the Invention

The present disclosure relates to an imaging optical system, a projection display device, and an imaging apparatus.

2. Description of the Related Art

An imaging optical system suitable for a digital camera or a projector is disclosed, for example, in JP2016-142883A.

SUMMARY OF THE INVENTION

In a case where temperature change occurs in an imaging optical system, a focus position may change as such, which is what is called "temperature drift." The degree of the temperature drift of the imaging optical system is determined by a material and shape of a lens, the material of a holding a frame of the lens, or the like, and in particular, it depends on the lens.

Designs have been made to suppress the temperature drift, general examples of the designs including changing the material of the lens and changing the shape of the lens. For example, in a case where a focus is changed in an extending direction at the time when temperature rises, a design has been made in which correction is performed such that the focus is reduced by using, for a positive lens, a material having a positive temperature coefficient of a refractive index and by using, for a negative lens, a material having a negative temperature coefficient of a refractive index. Conversely, in a case where the focus is changed in a reducing direction at the time when the temperature rises, a design has been made in which correction is performed such that the focus is extended by using, for a positive lens, a material having a negative temperature coefficient of the refractive index and by using, for a negative lens, a material having a positive temperature coefficient of a refractive index.

For finely correcting the variation in the focus position due to the temperature, suppressing the lens shape is required, but in a case of changing the lens shape for temperature compensation, aberration performance is degraded, it is not possible to achieve temperature compensation and optical performance at the same time.

In JP2016-142883A, it is disclosed that temperature characteristics are improved using a cemented lens. In a design of JP2016-142883A as an example, it is possible to perform temperature compensation, but the design cannot be employed in different specifications because it is difficult to achieve temperature compensation and good optical performance at the same time due to the above-mentioned problem.

Furthermore, in a case where the imaging optical system is included in the digital camera, temperature is likely to rise in the vicinity of imaging elements of the imaging optical system due to heat generated from imaging elements of the digital camera, and in a case where the imaging optical system is included in the projector, strong light emitted from a light source is absorbed in a stop in the imaging optical system. For these reasons, it is likely that temperature rises in the vicinity of the stop of the imaging optical system, and thus at the time of incorporating the imaging optical system into an optical device, a temperature distribution may occur in the imaging optical system. In this case, a change of the focus position occurs, rather than uniform temperature rising in the whole imaging optical system. The temperature distribution can be predicted accurately. As a result, at the design stage, it is not possible to accurately correct the change in the focus position due to temperature.

In recent years, with the increase in the number of pixels of an image display element mounted on the optical device, the resolution of the imaging optical system is also required to be increased. Therefore, the influence of the temperature drift is easily noticeable, and high-precision temperature compensation is required.

The present disclosure has been made in consideration of the above-mentioned circumstances, and the object of the invention is to provide an imaging optical system capable of achieving high-precision temperature compensation and high optical performance, a projection display device comprising the imaging optical system, and an imaging apparatus comprising the imaging optical system.

The specific means for achieving the object includes the following aspects.

<1> An imaging optical system comprising: a plurality of lenses, including a lens pair consisting of two lenses arranged near each other of the two lenses, in which radii of curvature of two surfaces arranged near each other is close to each other, wherein, assuming that among the two lenses in the lens pair, a lens with a smaller temperature coefficient of a refractive index of a lens material is a lens a and a lens with a larger temperature coefficient of the refractive index of the lens material is a lens b, a temperature coefficient of the refractive index of the lens a at 20° C. to 40° C. is $(dNa/dT) \times 10^{-6}$, a temperature coefficient of the refractive index of the lens b at 20° C. to 40° C. is $(dNb/dT) \times 10^{-6}$, the refractive index of the lens a at a d line is Na, the refractive index of the lens b at the d line is Nb, an Abbe number of the lens a at the d line is va, and an Abbe number of the lens b at the d line is vb, the following Conditional Expressions (1) to (3) are satisfied.

$$2<(dNb/dT-dNa/dT)/(Na-1) \tag{1}$$

$$|Nb-Na| \times 10^5 < 100 \tag{2}$$

$$|vb-va|<0.8 \tag{3}$$

<2> The imaging optical system according to <1>, in which, assuming that a minimum value of a thickness in an optical axis direction in an effective diameter of the lens pair is D and a maximum value of effective radii of a surface on a magnification side and a surface on a reduction side of the lens pair is H, the following Conditional Expression (4) is satisfied.

$$0.05<D/H \tag{4}$$

<3> The imaging optical system according to <1> or <2>, in which the imaging optical system has a zooming function, and assuming that a maximum value of heights of paraxial rays of a surface on a magnification side and a surface on a reduction side of the lens pair at a wide-angle end is hpw, and a maximum value of heights of paraxial rays of a lens surface of the entire system at the wide-angle end is hmaxw, the following Conditional Expression (5) is satisfied.

$$0.3<|hpw/hmaxw| \quad (5)$$

<4> The imaging optical system according to any one of <1> to <3>, in which the imaging optical system has a zooming function, and assuming that a maximum value of heights of paraxial rays of a surface on a magnification side and a surface on a reduction side of the lens pair at a telephoto end is hpt, and a maximum value of heights of paraxial rays of a lens surface of the entire system at the telephoto end is hmaxt, the following Conditional Expression (6) is satisfied.

$$0.3<|hpt/hmaxt| \quad (6)$$

<5> The imaging optical system according to <1> or <2>, in which the imaging optical system is a single focus optical system, and, assuming that a maximum value of heights of paraxial rays of a surface on a magnification side and a surface on a reduction side of the lens pair is hp and a maximum value of heights of paraxial rays of a lens surface of the entire system is hmax, the following Conditional Expression (7) is satisfied.

$$0.3<|hp/hmax| \quad (7)$$

<6> The imaging optical system according to any one of <1> to <5>, in which the number of the lens pair is two.

<7> The imaging optical system according to <1>, in which Conditional Expression (1-1) is satisfied.

$$4<(dNb/dT-dNa/dT)/(Na-1)<20 \quad (1-1)$$

<8> The imaging optical system according to <1>, in which Conditional Expression (2-1) is satisfied.

$$0 \leq |Nb-Na| \times 10^5 < 50 \quad (2-1)$$

<9> The imaging optical system according to <1>, in which Conditional Expression (3-1) is satisfied.

$$0 \leq |vb-va| < 0.5 \quad (3-1)$$

<10> The imaging optical system according to <2>, in which Conditional Expression (4-1) is satisfied.

$$0.1<D/H<5 \quad (4-1)$$

<11> The imaging optical system according to <3>, in which Conditional Expression (5-1) is satisfied.

$$0.5<|hpw/hmaxw|<1 \quad (5-1)$$

<12> The imaging optical system according to <4>, in which Conditional Expression (6-1) is satisfied.

$$0.5<|hpt/hmaxt|<1 \quad (6-1)$$

<13> The imaging optical system according to <5>, in which Conditional Expression (7-1) is satisfied.

$$0.5<|hp/hmax|<1 \quad (7-1)$$

<14> A projection display device comprising: a light valve that outputs an optical image based on image data; and the imaging optical system according to any one of <1> to <13>, in which the imaging optical system projects the optical image, which is output from the light valve, on a screen.

<15> An imaging apparatus comprising the imaging optical system according to any one of <1> to <13>.

In the present specification, the terms "consisting of ~" and "consists of ~" means that not only the above-mentioned elements may be included, but also a lens that has substantially no refractive power, an optical element other than the lens, such as a stop, a filter, and a cover glass, and mechanism parts, such as a lens flange, a lens barrel, an imaging element and a camera shake correction mechanism may be included.

Further, "heights of paraxial rays" in each conditional expression are calculated by making a ray having a height of 1 incident parallel to the optical axis from the magnification side at the time when the maximum image height is normalized to 10. With regard to values used in each conditional expression, are values for dNa/dT and dNb/dT are those based on the e line, and values for others are those based on the d line. A sign of the focal power and the surface shape of an aspheric surface are considered in terms of the paraxial region unless otherwise noted. The "C line", "d line", "e line" and "F line" described in the present specification are emission lines. The wavelength of the C line is 656.27 nm (nanometers), the wavelength of the d line is 587.56 nm (nanometers), the wavelength of the e line is 546.07 nm (nanometers), and the wavelength of the F line is 486.13 nm (nanometers).

According to the embodiment of the present invention, it is possible to provide an imaging optical system capable of achieving high optical performance and high-precision temperature compensation, a projection display device comprising the imaging optical system, and an imaging apparatus comprising the imaging optical system.

BRIEF DESCRIPTION OF THE DRAWINGS

FIG. 1 is a cross-sectional view illustrating a lens configuration (common to Example 1) of an imaging optical system according to an embodiment of the present invention.

FIG. 4 is a cross-sectional view illustrating a lens configuration of an imaging optical system of Example 4 of the present invention.

DESCRIPTION OF THE PREFERRED EMBODIMENTS

Figure 2:
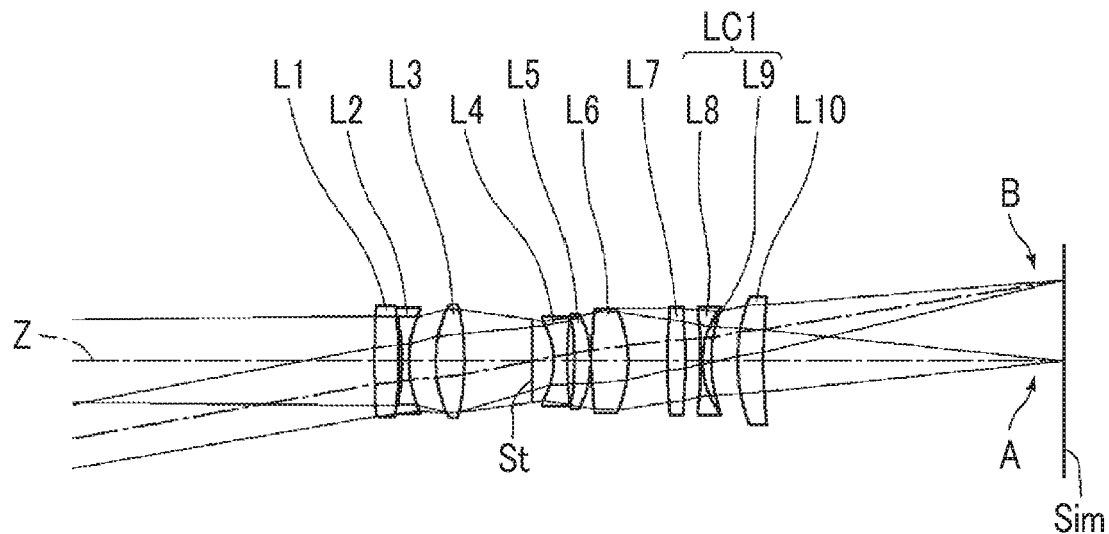
FIG. 2 is a cross-sectional view illustrating a lens configuration of an imaging optical system of Example 2 of the present invention.

Hereinafter, embodiments of the present invention will be described in detail with reference to the drawings. FIG. 1 is a cross-sectional view illustrating a lens configuration of an imaging optical system according to an embodiment of the present invention. The configuration example shown in FIG. 1 is the same as the configuration of the imaging optical system of Example 1 described later. In FIG. 1, the upper part shows a wide-angle end state, the lower part shows a telephoto end state, the left part is a magnification side, and the right part is a reduction side. Further, an aperture stop St shown in the drawing does not necessarily indicate its size and shape, and indicates its position on the optical axis Z. In addition, rays on axis A and rays with the maximum angle of view B are written together as the rays.

The imaging optical system is, for example, mounted on a projection display device, and can be used to project image information displayed on a light valve onto a screen. In FIG. 1, assuming that the imaging optical system is mounted on the projection display device, an optical member PP such as a filter or a prism used in a color synthesizing section or an illumination light separating section, and an image display surface Sim of the light valve are also shown. In the projection display device, rays, which are made to have image information through the image display element disposed on the image display surface Sim, are incident into the imaging optical system through the optical member PP, and are projected onto the screen, which is not shown in the drawing, through the imaging optical system.

The imaging optical system according to the present embodiment includes a plurality of lenses, and includes a lens pair consisting of two lenses arranged near each other, in which radii of curvature of two surfaces arranged near each other of two lenses is close to each other. The imaging optical system of the present embodiment illustrated in FIG. 1 includes, for example, two lens pairs, a first lens pair LC1 consisting of a lens L18 and a lens L19, and a second lens pair LC2 consisting of a lens L21 and a lens L22.

Here, "two lenses arranged near each other" means that the distance between the two lenses on an optical axis is equal to or within 10% of a larger one of effective diameters of the two lenses, and includes a case where two lenses are cemented with each other. Further, "the radii of curvature of two surfaces arranged near each other of the two lenses is close to each other" means that the difference between the radii of curvature of two surfaces is equal to or within 10% of a larger one of the radii of curvature of the two surfaces, and includes a case where the radii of curvature of the two surfaces are completely the same.

Of the two lenses in the lens pair, assuming that a lens with a smaller temperature coefficient of a refractive index of a lens material is a lens a and a lens with a larger temperature coefficient of a refractive index of a lens material is a lens b, a temperature coefficient of the refractive index of the lens a at 20° C. to 40° C. is $(dNa/dT) \times 10^{-6}$, a temperature coefficient of the refractive index of the lens b at 20° C. to 40° C. is $(dNb/dT) \times 10^{-6}$, a refractive index at the d line of the lens a is Na, a refractive index at the d line of the lens b is Nb, an Abbe number of the lens a at the d line is va, and an Abbe number of the lens b at the d line is vb, Conditional Expressions (1), (2) and (3) are satisfied.

$$2 < (dNb/dT - dNa/dT)/(Na-1) \quad (1)$$

$$|Nb-Na| \times 10^5 < 100 \quad (2)$$

$$|vb-va| < 0.8 \quad (3)$$

As described above, the first lens pair LC1 and the second lens pair LC2, which satisfies Conditional Expressions (1), (2) and (3), are provided, which makes the imaging optical system possible to achieve temperature compensation and good optical performance at the same time. Further, even in a case where temperature is corrected after prototyping of the imaging optical system, it is possible to correct temperature drift without affecting optical performance at room temperature simply by adjusting the arrangement order of materials of the two lenses and the radii of curvature of the two surfaces arranged near each other of the two lenses.

By not allowing the result of Conditional Expression (1) to be equal to or smaller than the lower limit, the temperature compensation range can be widened, and temperature drift correction in the lens pairs can be easily made. In addition, in a case where Conditional Expression (1-1) is satisfied, it is possible to obtain more favorable characteristics. By not allowing the result of Conditional Expression (1-1) to be equal to or larger than the upper limit, the optical glass is selected as the lens material. Therefore, deformation of the lens shape at the time of temperature change can be suppressed.

$$4 < (dNb/dT - dNa/dT)/(Na-1) < 20 \quad (1-1)$$

By not allowing the result of Conditional Expression (2) to be equal to or larger than the upper limit, it is possible to suppress variation in spherical aberration and image surface curvature at the time of temperature drift correction in the lens pair. In addition, in a case where Conditional Expression (2-1) is satisfied, it is possible to obtain more favorable characteristics.

$$0 \leq |Nb-Na| \times 10^5 < 50 \quad (2-1)$$

By not allowing the result of Conditional Expression (3) to be equal to or larger than the upper limit, it is possible to suppress variation in axial chromatic aberration and lateral chromatic aberration at the time of temperature drift correction in the lens pair. In addition, in a case where Conditional Expression (3-1) is satisfied, it is possible to obtain more favorable characteristics.

$$0 \leq |vb-va| < 0.5 \quad (3-1)$$

In the imaging optical system of the present embodiment, assuming that the minimum value of the thickness in the optical axis direction within the effective diameter of the lens pair is D, and the maximum value of the effective radii of a surface on the magnification side and a surface on the reduction side of the lens pair is H, it is preferable that Conditional Expression (4) be satisfied. By not allowing the result of Conditional Expression (4) to be equal to or smaller than the lower limit, it is possible to secure a degree of freedom of the radii of curvature of the two surfaces arranged near each other of two lenses, which makes it possible to easily make temperature drift correction in the lens pair. By not allowing the result of Conditional Expression (4) to be equal to or larger than the upper limit, it is possible to prevent the thickness of the lens pair from being too large, which makes it possible to easily install the lens pair in the image optical system. In addition, in a case where Conditional Expression (4-1) is satisfied, it is possible to obtain more favorable characteristics.

$$0.05 < D/H \quad (4)$$

$$0.1 < D/H < 5 \quad (4-1)$$

In a case where the imaging optical system has a zooming function, assuming that the maximum value of heights of a paraxial rays of the surface on the magnification side and the surface of the reduction side of the lens pair at the wide-angle end is hpw, and at the time when the maximum value of the heights of the paraxial rays of the lens surface of the entire system at the wide-angle end is hmaxw, it is preferable to satisfy the Conditional Expression (5). Examples 1 and 4 to be described later are examples in which the imaging optical system includes the zooming function. By not allowing the result of Conditional Expression (5) to be equal to or smaller than the lower limit, it is possible to prevent the height of an on-axis ray from becoming too low at the wide-angle end, which makes it possible perform sufficient temperature compensation. In addition, in a case where Conditional Expression (5-1) is satisfied, it is possible to obtain more favorable characteristics.

$$0.3 < |hpw/hmaxw| \tag{5}$$

$$0.5 < |hpw/hmaxw| < 1 \tag{5-1}$$

In a case where the imaging optical system has the zooming function, assuming that the maximum value of the heights of the paraxial ray of the surface on the magnification side and the surface on the reduction side of the lens pair at the telephoto end is hpt, and the maximum value of the heights of the paraxial rays of the lens surface of the entire system at the telephoto end is hmaxt, it is preferable to satisfy the Conditional Expression (6). Examples 1 and 4 to be described later are examples in which the imaging optical system includes the zooming function. By not allowing the result of Conditional Expression (6) to be equal to or smaller than the lower limit, it is possible to prevent the height of the on-axis ray from becoming too low at the telephoto end, which makes it possible to perform sufficient temperature compensation. In addition, in a case where Conditional Expression (6-1) is satisfied, it is possible to obtain more favorable characteristics.

$$0.3 < |hpt/hmaxt| \tag{6}$$

$$0.5 < |hpt/hmaxt| < 1 \tag{6-1}$$

In a case where the imaging optical system is a single focus optical system, assuming that the maximum value of the heights of the paraxial rays of the surface on the magnification side and the surface on the reduction side of the lens pair is hp and the maximum value of the heights of the paraxial rays of the lens surface of the entire system is hmax, it is preferable to satisfy the Conditional Expression (7). Examples 2 and 3 to be described later are examples in which the imaging optical system is a single focus optical system. By not allowing the result of Conditional Expression (7) to be equal to or smaller than the lower limit, it is possible to prevent the height of the on-axis ray from becoming too low, which makes it possible perform sufficient temperature compensation performed. In addition, in a case where Conditional Expression (7-1) is satisfied, it is possible to obtain more favorable characteristics.

$$0.3 < |hp/hmax| \tag{7}$$

$$0.5 < |hp/hmax| < 1 \tag{7-1}$$

Moreover, it is preferable to include two lens pairs. The imaging optical system of the present embodiment illustrated in FIG. 1 includes, as an example, two lens pairs of the first lens pair LC1 consisting of lenses L18 and L19 and the second lens pair LC2 consisting of lenses L21 and L22. With such aspects, finer temperature compensation can be performed.

Next, numerical examples of the imaging optical system of the embodiment of the present invention will be described.

EXAMPLE 1

FIG. 1 is a cross-sectional view illustrating a configuration of the imaging optical system of Example 1. Since the method illustrated in FIG. 1 has been described above, some repeated descriptions will be omitted here. Further, the illustration method is basically the same in Examples 2 to 4.

The imaging optical system of Example 1 has a zooming function and consists of twenty five lenses L1 to L25 in order from the magnification side to the reduction side along the optical axis Z, and is a relay type imaging optical system in which an intermediate image M is formed between L14 and L15. In addition, the intermediate image M is schematically illustrated in FIG. 1 and does not show an actual shape.

The imaging optical system of Example 1 includes two lens pairs, the first lens pair LC1 consisting of lenses L18 and L19, and the second lens pair LC2 consisting of lenses L21 and L22.

Also, a first moving lens group is composed of two lenses L15 and L16, a second moving lens group is composed of four lenses L17 to L20, and the third moving lens group is composed of four lenses L21 to L24. During zooming, the first moving lens group, the second moving lens group, and the third moving lens group move along the optical axis Z so as to change the distances between the groups near each other in the direction of the optical axis.

Table 1 shows basic lens data of the imaging optical system of Example 1, Table 2 shows data about the specification, Table 3 shows data about variable surface distances, and Table 4 shows data about aspheric surface coefficients thereof. Hereinafter, meanings of the reference signs in the tables are, for example, as described in Example 1, and are basically the same as those in Examples 2 to 4.

In the lens data of Table 1, the column of the surface number shows surface numbers. The surface of the elements closest to the magnification side is the first surface, and the surface numbers sequentially increase toward the reduction side. The column of the radius of curvature shows the radius of curvature of the respective surfaces. The column of the on-axis surface distance shows distances on the optical axis Z between the respective surfaces and the subsequent surfaces. The n column indicates the refractive index of each optical element at the d line, the ν column indicates the Abbe number of each optical element at the d line, and the material name column indicates the material name and manufacturer's name of each optical element, and the column of dN/dT indicates the temperature coefficient ($\times 10^{-6}$) of the refractive index of the material of each optical element. Furthermore, the sign of the radius of curvature is positive in a case where a surface has a shape convex toward the magnification side, and is negative in a case where a surface has a shape convex toward the reduction side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during focusing, DD [surface number] is noted. Numerical values each corresponding to the DD [surface number] are shown in Table 3.

In the data about the specification of Table 2, the zoom magnification, the focal length f, the back focal length Bf, the F number FNo, and the total angle of view 2ω[°] are noted.

In the lens data of Table 1, the reference sign * is attached to surface numbers of aspheric surfaces, and radii of curvature of the aspheric surfaces are represented by numerical values of paraxial radii of curvature. The data about aspheric surface coefficients of Table 4 shows the surface numbers of the aspheric surfaces and aspheric surface coefficients of the aspheric surfaces. The "E±n" (n: an integer) in numerical values of the aspheric surface coefficients of Table 4 indicates "×10±n". The aspheric surface coefficients are values of the coefficients KA and Am in aspheric surface expression represented as the following expression;

$$Zd = C \cdot h^2 / \{1 + (1 - KA \cdot C^2 \cdot h^2)^{1/2}\} + \Sigma Am \cdot h^m$$

where, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric surface coefficients, and S at the aspheric surface depth Zd means the sum with respect to m.

In the basic lens data and the data on specifications, values standardized with the maximum image height of 10 are shown. As a unit of angle, ° is used.

In addition, Table 5 shows the focus movement of the entire system due to refractive index change at the time when the temperature of only the first lens pair LC1 changes by +20° C., and Table 6 shows the movement amount of focus of the entire system due to the refractive index change at the time when the temperature of only the second lens pair LC2 changes by +20° C. Furthermore, the movement amount of focus indicated in the examples indicates the movement amount of focus at the time when only the refractive indexes of the lens pair changes due to temperature change, except for the influence at the time when the shape of the lens pair changes due to temperature change.

In a case where, for the two lenses of the first lens pair LC1, the lens a with a smaller temperature coefficient of a refractive index of a lens material and the lens b with a larger temperature coefficient of a refractive index of a lens material are used, as shown in Table 1, the lens L18 is the lens b (material b: BAC4. HOYA), the lens L19 is the lens a (material a: S-BAL14. OHARA).

As shown in Table 5, in a case where, for the two lenses of the first lens pair LC1, the lens L18 is set to material a and the lens L19 is set to material b, at the time when temperature changes in only the first lens pair LC1 by +20° C., a focus movement of −13.000 occurs. In a case where, for the two lenses of the first lens pair LC1, the lens L18 is set to material a and the lens L19 is set to material b, at the time when temperature changes in only the first lens pair LC1 by +20° C., a focus movement of 6.000 occurs. In a case where, for the two lenses of the first lens pair LC1, the lens L18 and the lens L19 are both set to material b, at the time when temperature changes in only the first lens pair LC1 by +20° C., a focus movement of −7.000 occurs. In a case where, for the two lenses of the first lens pair LC1, the lens L18 and lens L19 are both set to material a, at the time of temperature change of only the first lens pair LC1 by +20° C., a focus movement of −1.000 occurs.

That is, for the materials of the two lenses of the first lens pair LC1, two kinds of materials, the material a and the material b, are used, and arrangement order of the materials of the two lenses of the first lens pair LC1 and the radii of curvature of the two surfaces arranged near each other of the two lenses are adjusted. In this way, at the time when the temperature of the first lens pair LC1 only changes by +20° C., the focus movement of the entire system can be changed in the range of −13.000 to 6.000.

Therefore, even in a case where temperature drift is corrected after prototyping of the imaging optical system, just by adjusting the arrangement order of materials of two lenses of the first lens pair LC1 and the radii of curvature of the two surfaces arranged near each other of the two lenses, it is possible to correct temperature drift without affecting optical performance at room temperature of entire system.

As shown in Table 6, even for the second lens pair LC2, two kinds of materials of the material a and the material b are used as the materials of the two lenses, and arrangement order of the materials of the two lenses and the radii of curvature of the two surfaces arranged near each other of the two lenses are adjusted. Therefore, at the time when the temperature of the second lens pair LC2 only changes by +20° C., the focus movement of the entire system can be changed in the range of −5.000 to 12.000.

TABLE 1

| Surface Number | Radius of Curvature | Surface Distance | n | ν | Material Name | dN/dT |
|---|---|---|---|---|---|---|
| *1 | −24.3429 | 3.0773 | 1.53158 | 55.08 | | |
| *2 | −152.9991 | 4.6204 | | | | |
| 3 | 34.7606 | 1.3846 | 1.89190 | 37.13 | | |
| 4 | 19.2195 | 5.4798 | | | | |
| 5 | 36.2946 | 1.0000 | 1.84666 | 23.78 | | |
| 6 | 14.8707 | 6.1153 | | | | |
| 7 | 75.4493 | 0.8457 | 1.58913 | 61.13 | | |
| 8 | 19.6745 | 14.6316 | | | | |
| 9 | −17.3250 | 4.2109 | 1.48749 | 70.44 | | |
| 10 | −30.1761 | 1.8922 | | | | |
| 11 | −32.9626 | 5.7247 | 1.74400 | 44.79 | | |
| 12 | −28.0063 | 8.9759 | | | | |
| 13 | 1041.4977 | 5.5740 | 1.51680 | 64.20 | | |
| 14 | −36.2464 | 0.1540 | | | | |
| 15 | 59.3086 | 3.1485 | 1.84666 | 23.78 | | |
| 16 | 128.3643 | 46.8504 | | | | |
| 17 | 35.4296 | 12.1767 | 1.49700 | 81.61 | | |
| 18 | −25.6672 | 1.0846 | 1.84666 | 23.78 | | |
| 19 | −35.2205 | 1.6637 | | | | |
| 20 | −43.5278 | 1.0769 | 1.84666 | 23.78 | | |

TABLE 1-continued

| Surface Number | Radius of Curvature | Surface Distance | n | ν | Material Name | dN/dT |
|---|---|---|---|---|---|---|
| 21 | 25.7549 | 11.0101 | 1.49700 | 81.61 | | |
| 22 | −41.1762 | 10.3984 | | | | |
| *23 | −50.9712 | 2.8741 | 1.51007 | 56.24 | | |
| *24 | −29.2426 | 18.6246 | | | | |
| 25 | 61.2034 | 8.3645 | 1.77250 | 49.60 | | |
| 26 | −253.1244 | DD[26] | | | | |
| 27 | 40.0925 | 1.6538 | 1.84666 | 23.78 | | |
| 28 | 22.2043 | 8.9429 | 1.74950 | 35.28 | | |
| 29 | −334.1461 | DD[29] | | | | |
| 30 | 44.3763 | 0.7769 | 1.84666 | 23.78 | | |
| 31 | 16.4904 | 5.0825 | 1.56883 | 56.04 | BAC4.HOYA | 6.7 |
| 32 | −14.0000 | 0.5000 | 1.56883 | 56.36 | S-BAL14.OHARA | 2.0 |
| 33 | −251.8494 | 1.3927 | | | | |
| 34 | −19.1723 | 1.1869 | 1.84666 | 23.78 | | |
| 35 | −19.5208 | DD[35] | | | | |
| 36(stop) | ∞ | 12.6508 | | | | |
| 37 | −16.3987 | 3.3462 | 1.65100 | 56.16 | S-LAL54. OHARA | 1.4 |
| 38 | −8.5000 | 0.5000 | 1.65100 | 56.24 | S-LAL54Q.OHARA | 6.7 |
| 39 | 27.5838 | 5.0683 | 1.49700 | 81.61 | | |
| 40 | −30.7966 | 0.4500 | | | | |
| 41 | 77.6907 | 6.9708 | 1.49700 | 81.61 | | |
| 42 | −24.5845 | DD[42] | | | | |
| 43 | 53.2978 | 3.2439 | 1.84666 | 23.78 | | |
| 44 | −403.1172 | 11.5376 | | | | |
| 45 | ∞ | 23.0769 | 1.74320 | 49.34 | | |
| 46 | ∞ | 0.8077 | 1.51633 | 64.14 | | |
| 47 | ∞ | 0.0042 | | | | |

Example 1 Lens Data (n, ν at the d line)

TABLE 2

| | Wide-angle end | Telephoto end |
|---|---|---|
| Zoom ratio | 1.00 | 1.10 |
| \|f\| | 3.93 | 4.32 |
| Bf | 25.28 | 25.28 |
| FNo. | 2.40 | 2.50 |
| 2ω[°] | 137.0 | 133.4 |

Example 1 Specification (d line)

TABLE 3

| | Wide-angle end | Telephoto end |
|---|---|---|
| DD[26] | 94.7381 | 88.5147 |
| DD[29] | 16.3473 | 18.8106 |
| DD[35] | 1.9259 | 1.3606 |
| DD[42] | 0.4289 | 4.7543 |

Example 1 Variable Surface Distance

TABLE 4

| Surface Number | 1 | 2 | 23 | 24 |
|---|---|---|---|---|
| KA | −6.20293249E−01 | −2.70630630E−02 | −4.65068499E+00 | 5.54317746E−01 |
| A3 | 1.70357594E−03 | 2.31078292E−03 | 5.79605334E−19 | −7.29478021E−19 |
| A4 | 4.05904062E−05 | −1.73028088E−04 | 1.81101355E−04 | 1.92494076E−04 |
| A5 | −1.11878205E−05 | 1.78643738E−05 | −3.48400133E−05 | −2.52977434E−05 |
| A6 | 7.00982088E−07 | −1.16518228E−06 | 2.46761491E−06 | −3.26440369E−07 |
| A7 | −3.68918996E−09 | 4.68145024E−08 | 2.22843484E−07 | 5.41836310E−07 |
| A8 | −1.93515572E−09 | −7.17653489E−10 | −4.03653989E−08 | −3.48248734E−08 |
| A9 | 7.73318916E−11 | −3.85796226E−11 | −4.98833252E−10 | −4.93335359E−09 |
| A10 | 1.91682004E−12 | 1.69631027E−12 | 3.89551888E−10 | 6.49621459E−10 |
| A11 | −1.72744475E−13 | 1.37749504E−14 | −1.34893568E−11 | 4.39237469E−12 |
| A12 | 3.78452960E−16 | −1.16752607E−15 | −1.56884187E−12 | −3.91340769E−12 |
| A13 | 1.84927216E−16 | −1.99558949E−17 | 1.03698414E−13 | 1.18317676E−13 |
| A14 | −2.38528025E−18 | 9.50413282E−19 | 2.28287109E−15 | 9.88608851E−15 |
| A15 | −1.08468875E−19 | 7.02849658E−21 | −3.04447917E−16 | −5.67023604E−16 |
| A16 | 2.07916268E−21 | −2.01105554E−22 | 1.33735506E−18 | −7.53217441E−18 |
| A17 | 3.38211732E−23 | −1.00863053E−23 | 4.10528475E−19 | 1.00921441E−18 |
| A18 | −7.96173114E−25 | 2.18084807E−25 | −6.87546189E−21 | −8.50678823E−21 |
| A19 | −4.42955106E−27 | −4.37341534E−28 | −2.12433728E−22 | −6.43646818E−22 |
| A20 | 1.18510455E−28 | −9.51218370E−30 | 5.07156915E−24 | 1.22441375E−23 |

Example 1 Aspheric Surface Coefficient

TABLE 5

|  | Wide-angle end | Telephoto end |
| --- | --- | --- |
| Material b + Material a | −13.000 | −13.000 |
| Material a + Material b | 6.000 | 6.000 |
| Material b only | −7.000 | −7.000 |
| Material a only | −1.000 | −1.000 |

Example 1 The focus movement of the entire system due to refractive index change at the time when only the first lens pair changes temperature by +20° C.

TABLE 6

|  | Wide-angle end | Telephoto end |
| --- | --- | --- |
| Material a + Material b | 11.000 | 12.000 |
| Material b + Material a | −5.000 | −5.000 |
| Material a only | 0.000 | 0.000 |
| Material b only | 6.000 | 7.000 |

Example 1 The focus movement of the entire system due to refractive index change at the time when only the second lens pair changes temperature by +20° C.

Figure 5:
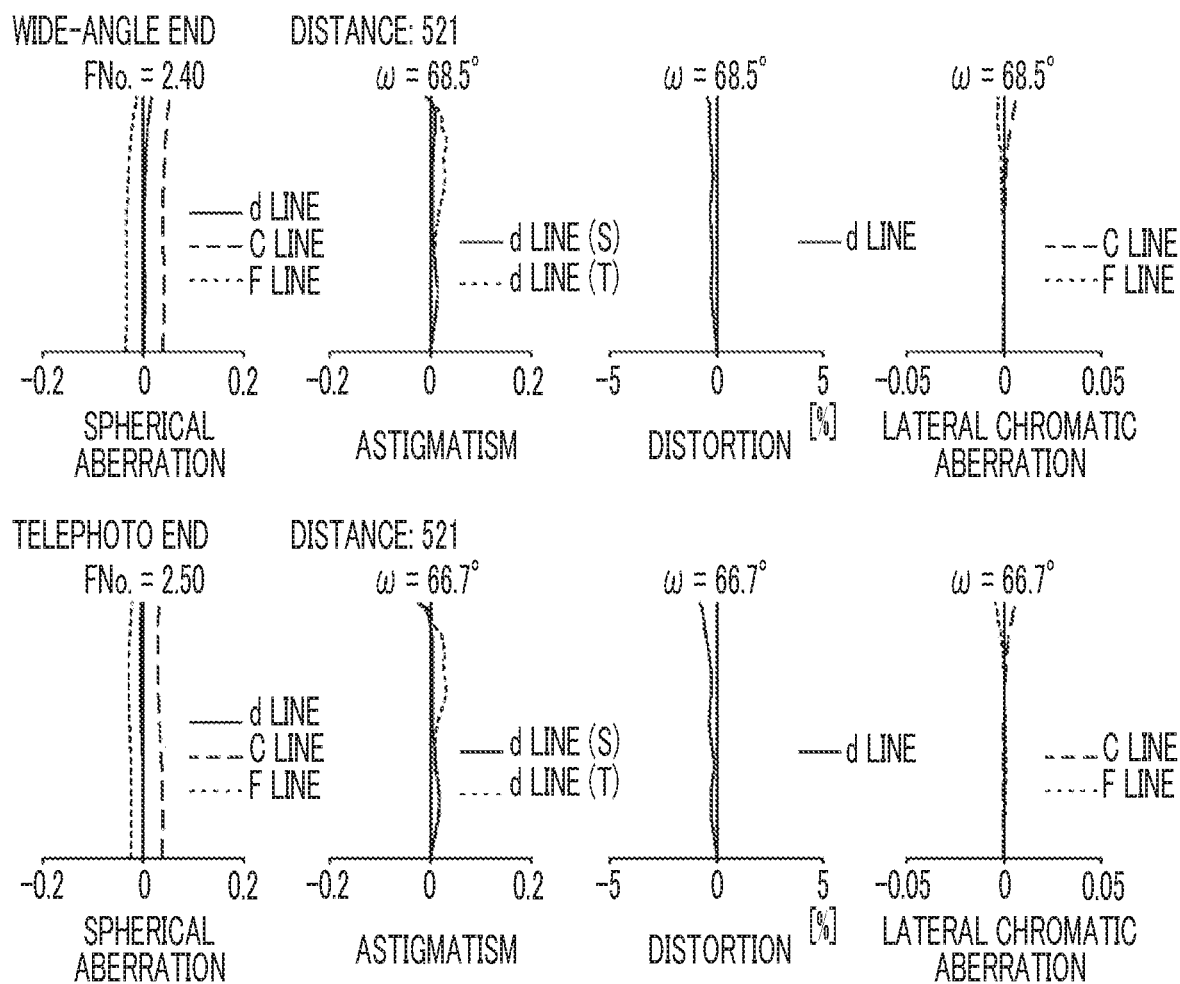
FIG. 5 is a diagram of aberrations of the imaging optical system of Example 1 of the present invention.
Figure 9:
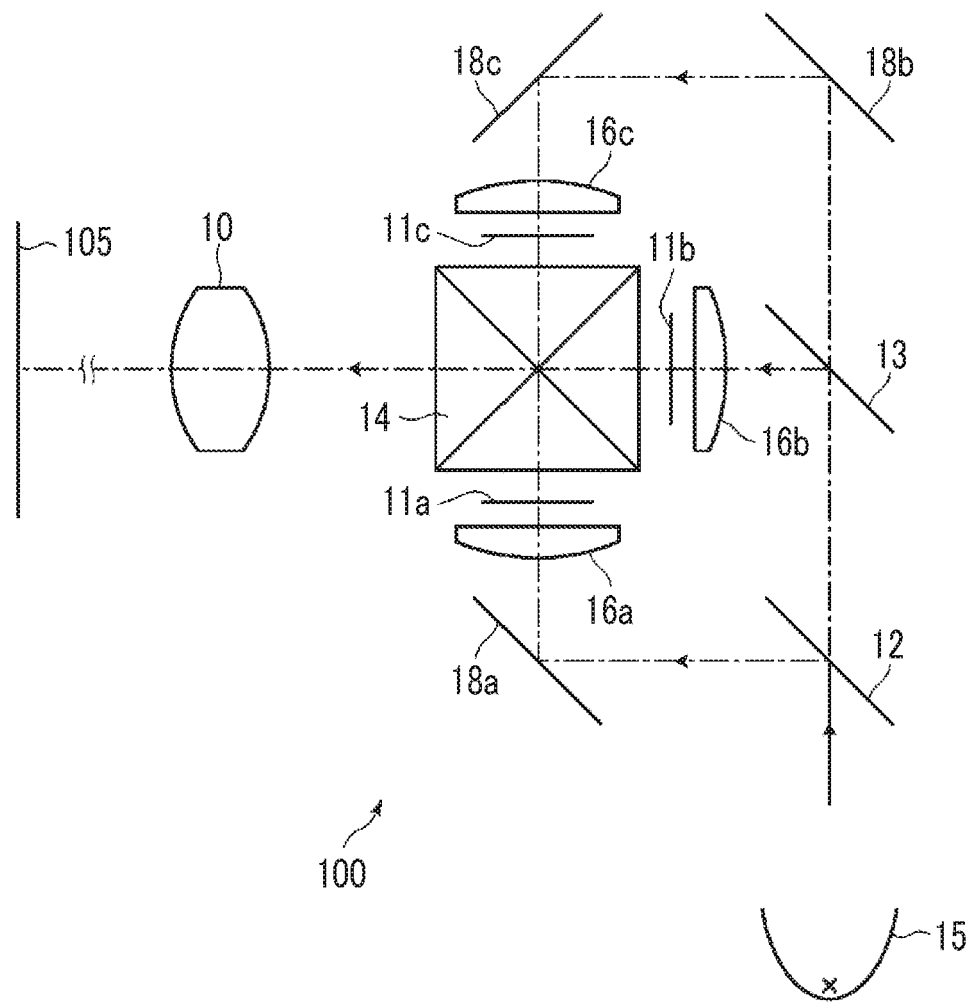
FIG. 9 is a schematic configuration diagram of a projection display device according to the embodiment of the present invention.

FIG. 5 shows a diagram of the aberrations of the imaging optical system of Example 1. In FIG. 5, in order from the left side, spherical aberration, astigmatism, distortion, and lateral chromatic aberration are shown. FIG. 9 shows a diagram of aberrations in a state in which the distance from the magnification side image forming surface to the magnification side surface of the lens L1 at the wide-angle end is 521 in upper end and a diagram of aberrations in a state in which the distance from the magnification side image forming surface to the magnification side surface of the lens L1 at the telephoto end is 521 in lower end.

In the spherical aberration diagram, aberrations at the d line, the C line, and the F line are indicated by the solid line, the long dashed line and the short dashed line, respectively. In the astigmatism diagram, the aberration in the sagittal direction at the d line is indicated by the solid line, and the aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In other aberration diagrams, ω indicates a half angle of view.

Example 2

Figure 6:
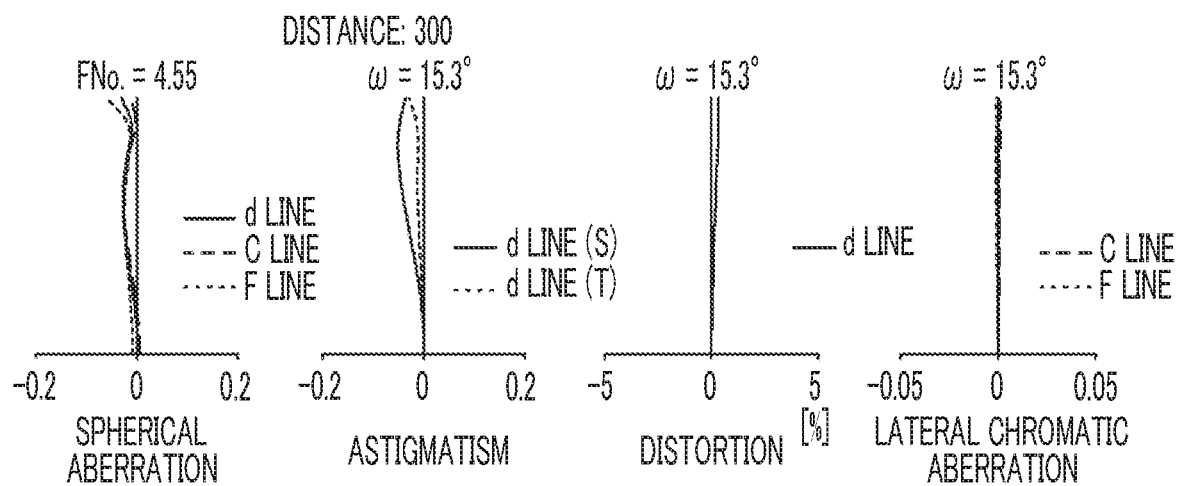
FIG. 6 is a diagram of aberrations of the imaging optical system of Example 2 of the present invention.

Next, an imaging optical system of Example 2 will be described. FIG. 2 is a cross-sectional view illustrating a configuration of the imaging optical system of Example 2. The image optical system of Example 2 is a single focus optical system and includes 10 lenses L1 to L10 in order from the magnification side to the reduction side along the optical axis Z. The imaging optical system of Example 2 includes a first lens pair LC1 consisting of lenses L8 and L9. Table 7 shows the basic lens data of the imaging optical system of Example 2, Table 8 shows the data on specifications, Table 9 shows, focus movement of the entire system depending on refractive index change at the time when the temperature of the first lens pair LC1 only changes by +20° C., and FIG. 6 illustrates a diagram of aberrations in a state where the distance from the magnification side imaging surface to the surface on the magnification side of the lens L1 is 300.

TABLE 7

| Surface Number | Radius of Curvature | Surface Distance | n | ν | Material Name | dN/dT |
| --- | --- | --- | --- | --- | --- | --- |
| 1 | 56.1478 | 2.0145 | 1.78470 | 26.29 |  |  |
| 2 | −34.5217 | 0.2319 |  |  |  |  |
| 3 | −20.4667 | 0.5710 | 1.67300 | 38.15 |  |  |
| 4 | 11.1699 | 2.1594 |  |  |  |  |
| 5 | 11.6243 | 2.3304 | 1.61800 | 63.33 |  |  |
| 6 | −22.1368 | 5.3942 |  |  |  |  |
| 7(stop) | ∞ | 1.7826 |  |  |  |  |
| 8 | −7.2139 | 1.0087 | 1.65412 | 39.68 |  |  |
| 9 | 34.7652 | 0.6000 |  |  |  |  |
| 10 | −23.9472 | 1.3188 | 1.49700 | 81.54 |  |  |
| 11 | −9.2081 | 0.0435 |  |  |  |  |
| 12 | 40.2870 | 2.9420 | 1.61800 | 63.33 |  |  |
| 13 | −11.8852 | 3.1821 |  |  |  |  |
| 14 | 51.8174 | 1.4493 | 1.80518 | 25.42 |  |  |
| 15 | −51.8174 | 1.2319 |  |  |  |  |
| 16 | −46.8435 | 0.1500 | 1.80440 | 39.59 | S-LAH63.OHARA | 7.6 |
| 17 | 8.0000 | 0.7225 | 1.80440 | 39.58 | S-LAH63Q.OHARA | 1.9 |
| 18 | 14.2038 | 2.0870 |  |  |  |  |
| 19 | 15.7562 | 2.0870 | 1.48749 | 70.24 |  |  |
| 20 | 55.9333 | 24.2578 |  |  |  |  |

Example 2 Lens Data (n, ν at the d line)

TABLE 8

| f | 33.00 |
| --- | --- |
| Bf | 20.65 |
| FNo. | 4.55 |
| 2ω[°] | 30.6 |

Example 2 Specification

TABLE 9

| Material b + Material a | 13.000 |
| --- | --- |
| Material a + Material b | −5.000 |
| Material b only | 8.000 |
| Material a only | 0.000 |

Example 2 The focus movement of the entire system due to refractive index change at the time when only the first lens pair changes temperature by +20° C.

Example 3

Figure 3:
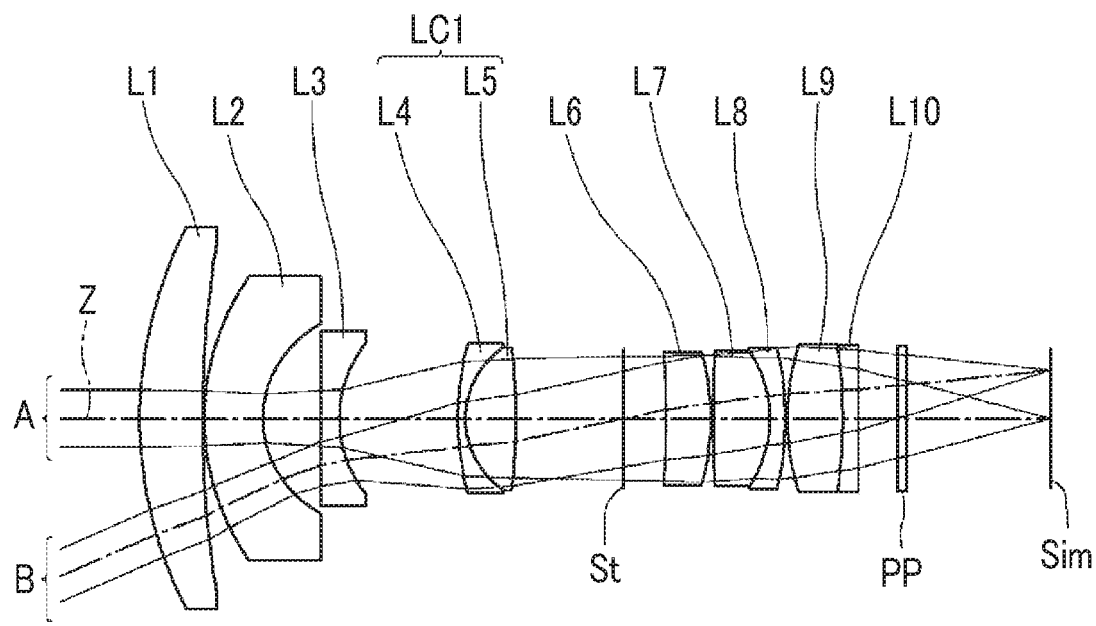
FIG. 3 is a cross-sectional view illustrating a lens configuration of an imaging optical system of Example 3 of the present invention.
Figure 7:
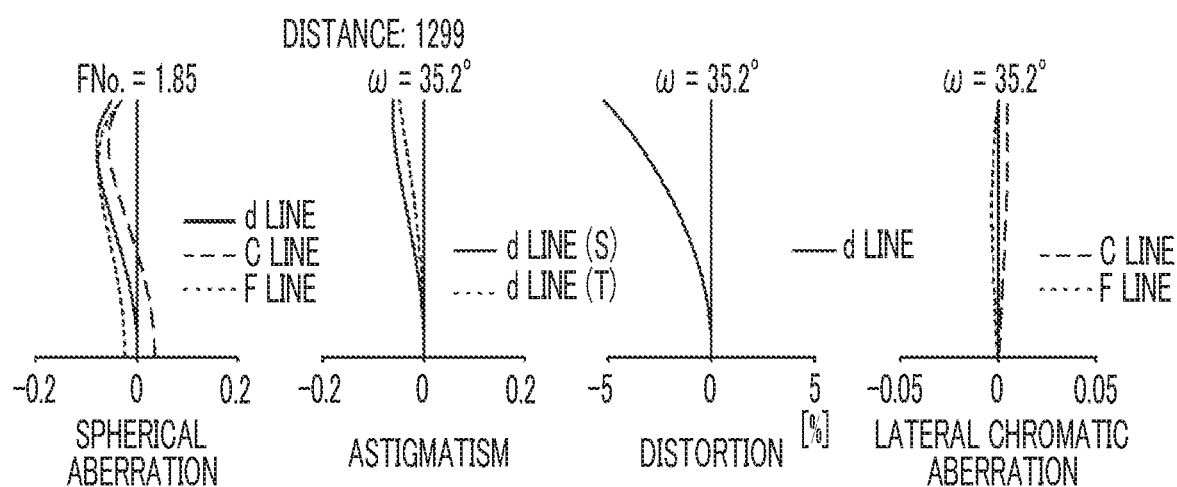
FIG. 7 is a diagram of aberrations of the imaging optical system of Example 3 of the present invention.

Next, an imaging optical system of Example 3 will be described. FIG. 3 is a cross-sectional view illustrating a configuration of the imaging optical system of Example 3. The imaging optical system of Example 3 is a single focus optical system, and includes ten lenses L1 to L10 in order from the magnification side to the reduction side along the optical axis Z. The imaging optical system of Example 3 includes a first lens pair LC1 consisting of lenses L4 and L5. In addition, Table 10 shows the basic lens data of the imaging optical system of Example 3, Table 11 shows the data on specifications, Table 12 shows focus movement of the entire system depending on refractive index change at the time when the temperature of the first lens pair LC1 only changes by +20° C., and FIG. 7 illustrates a diagram of aberrations in a state where the distance from the magnification side imaging surface to the surface on the magnification side of the lens L1 is 1299.

TABLE 10

| Surface Number | Radius of Curvature | Surface Distance | n | ν | Material Name | dN/dT |
|---|---|---|---|---|---|---|
| 1 | 63.3846 | 8.4675 | 1.51680 | 64.20 | | |
| 2 | 163.7895 | 0.2597 | | | | |
| 3 | 37.9386 | 7.9221 | 1.71700 | 47.93 | | |
| 4 | 15.9310 | 7.8442 | | | | |
| 5 | ∞ | 2.4935 | 1.71299 | 53.87 | | |
| 6 | 18.2839 | 16.0779 | | | | |
| 7 | 44.2059 | 1.0000 | 1.79952 | 42.22 | S-LAH52.OHARA | 6.9 |
| 8 | 13.0000 | 6.8182 | 1.79952 | 42.24 | S-LAH52Q.OHARA | 10.6 |
| 9 | −106.5063 | 14.4675 | | | | |
| 10(stop) | ∞ | 5.7403 | | | | |
| 11 | −147.6468 | 6.0779 | 1.52249 | 59.83 | | |
| 12 | −37.6592 | 0.2597 | | | | |
| 13 | 158.2462 | 7.7403 | 1.49700 | 81.54 | | |
| 14 | −18.5325 | 2.1039 | 1.78472 | 25.68 | | |
| 15 | −45.2705 | 0.2597 | | | | |
| 16 | 37.0662 | 7.4805 | 1.71299 | 53.87 | | |
| 17 | −86.9481 | 2.2078 | 1.76182 | 26.52 | | |
| 18 | ∞ | 5.1948 | | | | |
| 19 | ∞ | 1.2987 | 1.51633 | 64.14 | | |
| 20 | ∞ | 19.4878 | | | | |

Example 3 Lens Data (n, ν at the d line)

TABLE 11

| | |
|---|---|
| f | 27.72 |
| Bf | 46.88 |
| FNo. | 1.85 |
| 2ω[°] | 70.4 |

Example 3 Specification

TABLE 12

| | |
|---|---|
| Material a + Material b | −10.000 |
| Material b + Material a | 2.000 |
| Material a only | −3.000 |
| Material b only | −5.000 |

Example 3 The focus movement of the entire system due to refractive index change at the time when only the first lens pair changes temperature by +20° C.

Example 4

Next, an imaging optical system of Example 4 will be described. FIG. 4 is a cross-sectional view illustrating a configuration of the imaging optical system of Example 4. The imaging optical system of Example 4 has a zooming function and consists of thirty-one lenses L1 to L31 in order from the magnification side to the reduction side along the optical axis Z. The imaging optical system of Example 4 includes two lens pairs of the first lens pair LC1 consisting of lenses L3 and L4, and the second lens pair LC2 consisting of lenses L21 and L22. Also, a first moving lens group is composed of a lens only L11, a second moving lens group is composed of five lenses L12 to L16, and the third moving lens group is composed of two lenses L17 to L18. During zooming, the first moving lens group, the second moving lens group, and the third moving lens group move along the optical axis Z so as to change distances between the groups near each other in the direction of the optical axis.

Figure 8:
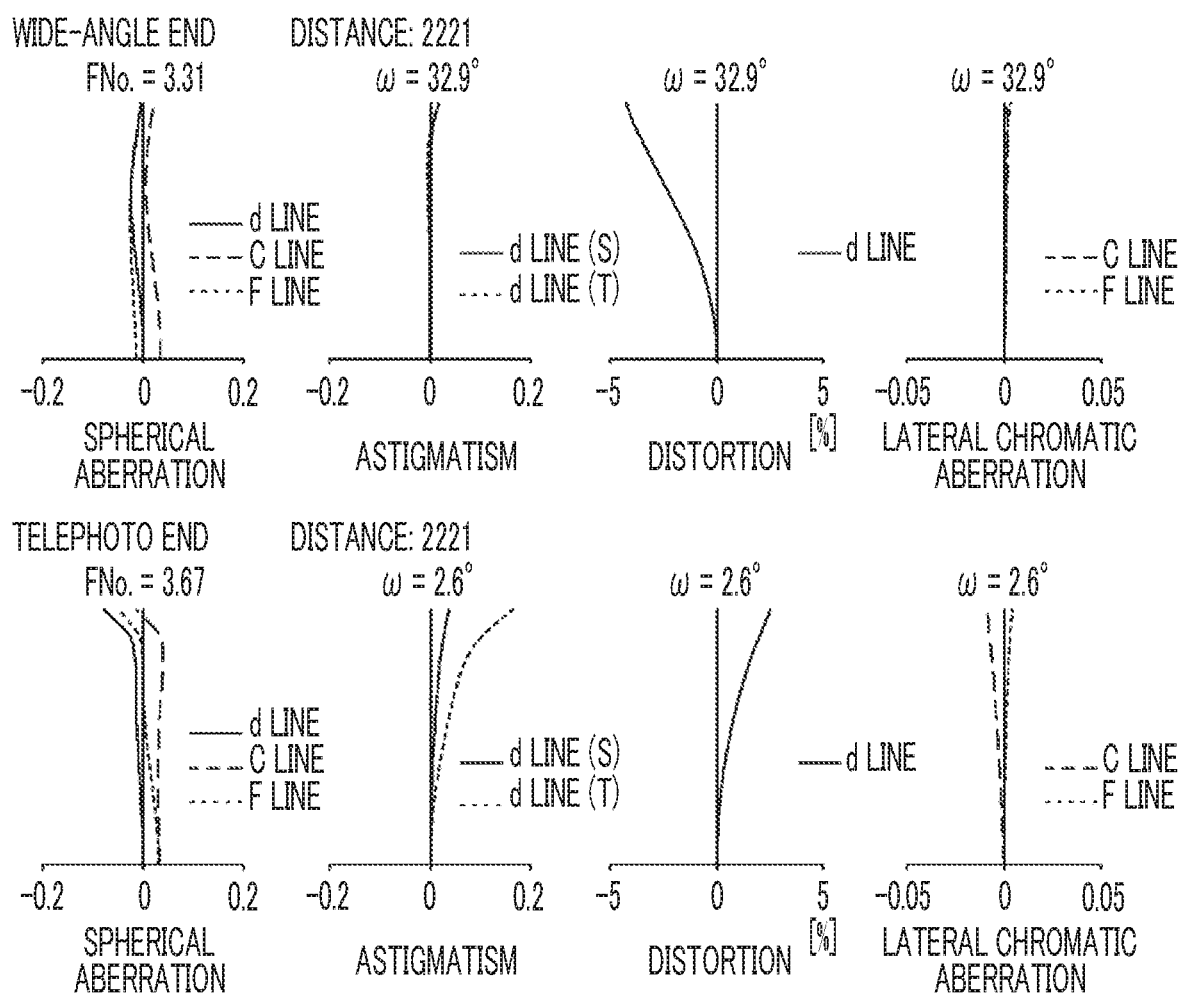
FIG. 8 is a diagram of aberrations of the imaging optical system of Example 4 of the present invention.

In addition, Table 13a and 13b show the basic lens data of the imaging optical system of Example 4, Table 14 shows the data on specifications, Table 15 shows the data about variable surface distance, Table 16 shows the data about aspheric surface coefficients, Table 17 shows focus movement of the entire system depending on refractive index change at the time when the temperature of the first lens pair LC1 only changes by +20° C., Table 18 shows focus movement of the entire system depending on refractive index change at the time when the temperature of the second lens pair LC2 only changes by +20° C., and FIG. 8 illustrates a diagram of aberrations in a state where the distance from the magnification side imaging surface to the surface on the magnification side of the lens L1 is 2221.

TABLE 13a

| Surface Number | Radius of Curvature | Surface Distance | n | ν | Material Name | |
|---|---|---|---|---|---|---|
| 1 | 623.7136 | 2.1875 | 1.83481 | 42.72 | | |
| 2 | 89.9324 | 13.7000 | | | | |
| 3 | −119.3280 | 0.9475 | 1.77250 | 49.60 | | |
| 4 | 145.9375 | 6.9938 | 1.84666 | 23.83 | SF57.SCHOTT | 12.5 |
| 5 | −312.5000 | 0.0500 | | | | |
| 6 | −310.0000 | 0.9375 | 1.84666 | 23.78 | S-TIH53.OHARA | 2 |
| 7 | −594.1855 | 4.0524 | | | | |
| 8 | 140.4196 | 10.9875 | 1.49700 | 81.61 | | |
| 9 | −140.4196 | 0.2500 | | | | |
| *10 | 171.8877 | 6.1062 | 1.48749 | 70.24 | | |
| 11 | −399.6420 | 0.3313 | | | | |
| 12 | −623.1739 | 2.0625 | 1.72047 | 34.71 | | |
| 13 | 76.6812 | 8.3563 | 1.49700 | 81.61 | | |
| 14 | 610.1458 | 10.4727 | | | | |
| 15 | 187.2990 | 8.1500 | 1.59282 | 68.62 | | |
| 16 | −187.2990 | 0.1875 | | | | |
| 17 | 85.8984 | 8.7500 | 1.49700 | 81.61 | | |
| 18 | ∞ | DD[18] | | | | |
| 19 | 112.6237 | 3.3875 | 1.43700 | 95.10 | | |
| 20 | −569.7959 | DD[20] | | | | |
| *21 | 396.8709 | 0.9375 | 2.00069 | 25.46 | | |
| 22 | 25.4164 | 5.3000 | | | | |
| 23 | −41.3924 | 0.7500 | 1.59282 | 68.62 | | |
| 24 | 49.2937 | 2.1688 | | | | |
| 25 | −273.2984 | 5.3876 | 1.59270 | 35.31 | | |
| 26 | −19.3850 | 0.9375 | 1.59282 | 68.62 | | |
| 27 | −128.0349 | 0.1875 | | | | |
| 28 | 60.1205 | 3.0500 | 1.73800 | 32.26 | | |
| 29 | −108.9674 | DD[29] | | | | |
| 30 | −32.3907 | 0.8188 | 1.49700 | 81.61 | | |

Example 4 Lens Data (n, ν at the d line)

TABLE 13b

| 31 | 54.3694 | 1.5625 | 1.84661 | 23.88 | | |
|---|---|---|---|---|---|---|
| 32 | 127.6922 | DD[32] | | | | |
| 33(stop) | ∞ | 1.2313 | | | | |
| 34 | 130.2623 | 3.5688 | 1.74320 | 49.34 | | |
| 35 | −52.3851 | 0.6625 | | | | |
| 36 | −39.6888 | 1.0313 | 1.72047 | 34.71 | | |
| 37 | −62.2142 | 1.2500 | | | | |
| 38 | 37.3188 | 4.2888 | 1.56883 | 56.04 | BAC4.HOYA | 6.7 |
| 39 | −70.0000 | 0.5000 | 1.56883 | 56.36 | S-BAL14.OHARA | 2 |
| 40 | −264.5894 | 0.1875 | | | | |
| 41 | 21.3446 | 6.4688 | 1.43700 | 95.10 | | |
| 42 | −100.4438 | 0.8125 | 1.90366 | 31.31 | | |
| 43 | 34.6261 | 2.3750 | | | | |
| 44 | −145.2415 | 2.3250 | 1.84661 | 23.88 | | |
| 45 | −32.5000 | 0.8813 | 1.83481 | 42.72 | | |
| 46 | −64.4628 | 4.5875 | | | | |
| 47 | 28.0998 | 2.6750 | 1.49700 | 81.61 | | |
| 48 | −105.7837 | 1.4625 | | | | |
| 49 | 131.6450 | 0.6250 | 1.88300 | 40.80 | | |
| 50 | 11.8312 | 6.8251 | 1.43700 | 95.10 | | |
| 51 | −18.3900 | 0.5625 | 1.77250 | 49.60 | | |
| 52 | −233.1378 | 22.9313 | | | | |
| 53 | 101.9411 | 1.2000 | 1.80518 | 25.42 | | |
| 54 | ∞ | 2.1875 | | | | |

TABLE 13b-continued

| 55 | ∞ | 1.4375 | 1.51633 | 64.14 |
|---|---|---|---|---|
| 56 | ∞ | 17.6250 | | |

Example 4 Lens Data (n, ν at the d line)

TABLE 14

| | Wide-angle end | Telephoto end |
|---|---|---|
| Zoom ratio | 1.00 | 11.60 |
| f | 16.12 | 175.84 |
| Bf | 20.65 | 6.34 |
| FNo. | 3.31 | 3.67 |
| 2ω[°] | 65.8 | 5.2 |

Example 4 Specification (d line)

TABLE 15

| | Wide-angle end | Telephoto end |
|---|---|---|
| DD[18] | 0.7437 | 41.1478 |
| DD[20] | 0.7000 | 27.2923 |
| DD[29] | 53.4188 | 12.2720 |
| DD[32] | 28.1125 | 2.2629 |

Example 4 Variable Surface Distance

TABLE 16

| Surface Number | 10 |
| --- | --- |
| KA | 1.00000000E+00 |
| A3 | 0.00000000E+00 |
| A4 | −3.59585347E−07 |

TABLE 16-continued

| A5 | −3.44544687E−11 |
| --- | --- |
| A6 | 1.74600701E−12 |
| A7 | 1.26687364E−13 |
| A8 | −3.93732735E−15 |
| A9 | −3.12292081E−17 |
| A10 | 1.37321024E−18 |

| Surface Number | 21 |
| --- | --- |
| KA | 1.00000000E+00 |
| A4 | 2.06059258E−06 |
| A6 | −3.43584551E−09 |
| A8 | 8.22402356E−13 |
| A10 | −3.61151590E−15 |

Example 4 Aspheric Surface Coefficient

TABLE 17

|  | Wide-angle end | Telephoto end |
| --- | --- | --- |
| Material b + Material a | −1.000 | −83.000 |
| Material a + Material b | 0.000 | 15.000 |
| Material b only | 0.000 | −69.000 |
| Material a only | 0.000 | 1.000 |

Example 4 The focus movement of the entire system due to refractive index change at the time when only the first lens pair changes temperature by +20° C.

TABLE 18

|  | Wide-angle end | Telephoto end |
| --- | --- | --- |
| Material b + Material a | −40.000 | −39.000 |
| Material a + Material b | 7.000 | 7.000 |
| Material b only | −30.000 | −30.000 |
| Material a only | −3.000 | −3.000 |

Example 4 The focus movement of the entire system due to refractive index change at the time when only the second lens pair changes temperature by +20° C.

Table 19 shows values corresponding to symbols included in Conditional Expressions (1) to (7) of the imaging optical system of Examples 1 to 4, and Table 20 shows values corresponding to Conditional Expressions (1) to (7) of the imaging optical system of Examples 1 to 4. In all the Examples, dNa/dT and dNb/dT are values based on the e line, and other values are values based on the d line.

TABLE 19

| Symbol | Example 1 The first lens pair | Example 1 The second lens pair | Example 2 The first lens pair | Example 3 The first lens pair | Example 4 The first lens pair | Example 4 The second lens pair |
| --- | --- | --- | --- | --- | --- | --- |
| dNa/dT | 2.0 | 1.4 | 1.9 | 6.9 | 2.0 | 2.0 |
| dNb/dT | 6.7 | 6.7 | 7.6 | 10.6 | 12.5 | 6.7 |
| Na | 1.56883 | 1.651 | 1.8044 | 1.79952 | 1.84666 | 1.56883 |
| Nb | 1.56883 | 1.651 | 1.8044 | 1.79952 | 1.84666 | 1.56883 |
| νa | 56.36 | 56.16 | 39.58 | 42.22 | 23.78 | 56.36 |
| νb | 56.04 | 56.24 | 39.59 | 42.24 | 23.83 | 56.04 |
| D | 3.599 | 3.846 | 0.872 | 5.907 | 2.489 | 1.749 |
| H | 7.634 | 9.335 | 4.632 | 10.865 | 35.652 | 13.877 |
| hpw | 7.976 | 6.302 | — | — | 1.178 | 5.558 |
| hmaxw | 9.644 | 9.644 | — | — | 5.558 | 5.558 |
| hpt | 7.438 | 6.121 | — | — | 1.178 | 0.479 |
| hmaxt | 8.969 | 8.969 | — | — | 1.359 | 1.359 |
| hp | — | — | 0.733 | 1.930 | — | — |
| hmax | — | — | 1.092 | 2.093 | — | — |

TABLE 20

| Expression Number | Conditional Expression | Example 1 The first lens pair | Example 1 The second lens pair | Example 2 The first lens pair |
| --- | --- | --- | --- | --- |
| (1) | (dNb/dT − dNa/dT)/(Na − 1) | 8.26 | 8.14 | 7.09 |
| (2) | \|Nb − Na\|* 100000 | 0.00 | 0.00 | 0.00 |
| (3) | \|νb − νa\| | 0.32 | 0.08 | 0.01 |
| (4) | D/H | 0.472 | 0.412 | 0.188 |
| (5) | \|hpw/hmaxw\| | 0.827 | 0.653 | — |
| (6) | \|hpt/hmaxt\| | 0.829 | 0.683 | — |
| (7) | \|hp/hmax\| | — | — | 0.672 |

| Expression Number | Conditional Expression | Example 3 The first lens pair | Example 4 The first lens pair | Example 4 The second lens pair |
| --- | --- | --- | --- | --- |
| (1) | (dNb/dT − dNa/dT)/(Na − 1) | 4.63 | 12.40 | 8.26 |
| (2) | \|Nb − Na\| *100000 | 0.00 | 0.00 | 0.00 |
| (3) | \|νb − νa\| | 0.02 | 0.05 | 0.32 |
| (4) | D/H | 0.544 | 0.070 | 0.126 |
| (5) | \|hpw/hmaxw\| | — | 0.212 | 1.000 |
| (6) | \|hpt/hmaxt\| | — | 0.867 | 0.353 |
| (7) | \|hp/hmax\| | 0.922 | — | — |

From the above data, all of the imaging optical systems of Examples 1 to 4 satisfy the corresponding items of the Conditional expressions (1) to (7), and are capable of achieving high-precision temperature compensation and high optical performance.

Next, a projection display device according to an embodiment of the present invention will be described. FIG. 9 is a schematic configuration diagram of the projection display device according to the above-mentioned embodiment of the present invention. The projection display device 100 illustrated in FIG. 9 has an imaging optical system 10 according to the above-mentioned embodiment of the present invention, a light source 15, transmissive display elements 11*a* to 11*c* as light valves corresponding to respective color light rays, dichroic mirrors 12 and 13 for color separation, a cross dichroic prism 14 for color synthesis, condenser lenses 16a to 16c, and total reflection mirrors 18a to 18c for deflecting the optical axis. In FIG. 9, the imaging optical system 10 is schematically illustrated. Further, an integrator is disposed between the light source 15 and the dichroic mirror 12 but not illustrated in FIG. 9.

White light originated from the light source 15 is separated into rays with three colors (G (Green) light, B (Blue) light, R (Red) light) through the dichroic mirrors 12 and 13. Thereafter, the rays respectively pass through the condenser lenses 16a to 16c, are incident into and optically modulated through the transmissive display elements 11a to 11c respectively corresponding to the rays with the respective colors, are subjected to color synthesis through the cross dichroic prism 14, and are subsequently incident into the imaging optical system 10. The imaging optical system 10 projects an optical image, which is formed by the light optically modulated through the transmissive display elements 11a to 11c, onto a screen 105.

Figure 10:
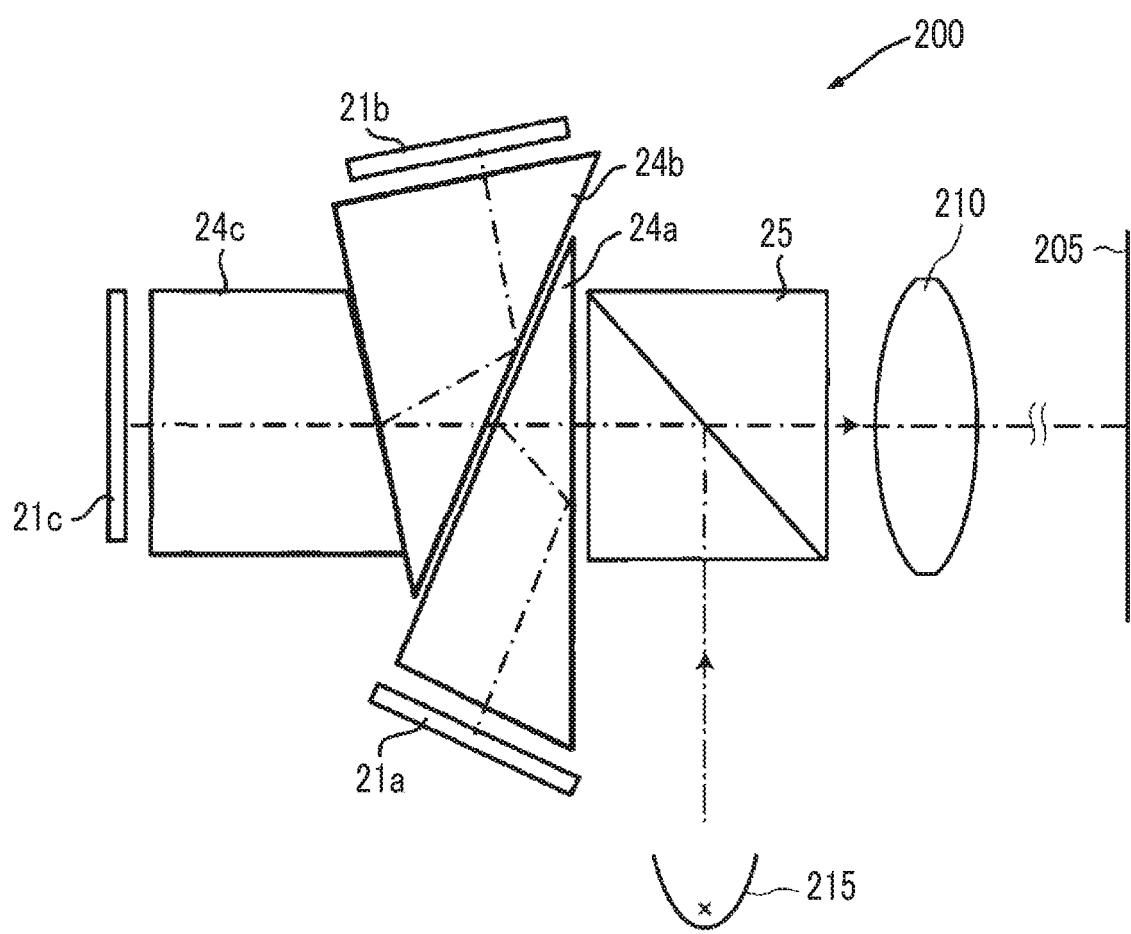
FIG. 10 is a schematic configuration diagram of a projection display device according to another embodiment of the present invention.

FIG. 10 is a schematic configuration diagram of a projection display device according to another embodiment of the present invention. The projection display device 200 illustrated in FIG. 10 has an imaging optical system 210 according to the above-mentioned embodiment of the present invention, a light source 215, DMD elements 21a to 21c as light valves corresponding to respective color light rays, total internal reflection (TIR) prisms 24a to 24c for color separation and color synthesis, and a polarization separating prism 25 that separates illumination light and projection light. In FIG. 10, the imaging optical system 210 is schematically illustrated. Further, an integrator is disposed between the light source 215 and the polarization separating prism 25, but illustration thereof is omitted in FIG. 10.

White light originated from the light source 215 is reflected on a reflective surface inside the polarization separating prism 25, and is separated into rays with three colors (G light, B light, R light) through the TIR prisms 24a to 24c. The separated rays with the respective colors are respectively incident into and optically modulated through the corresponding DMD elements 21a to 21c, travel through the TIR prisms 24a to 24c again in a reverse direction, are subjected to color synthesis, are subsequently transmitted through the polarization separating prism 25, and are incident into the imaging optical system 210. The imaging optical system 210 projects an optical image, which is formed by the light optically modulated through the DMD elements 21a to 21c, onto a screen 205.

Figure 11:
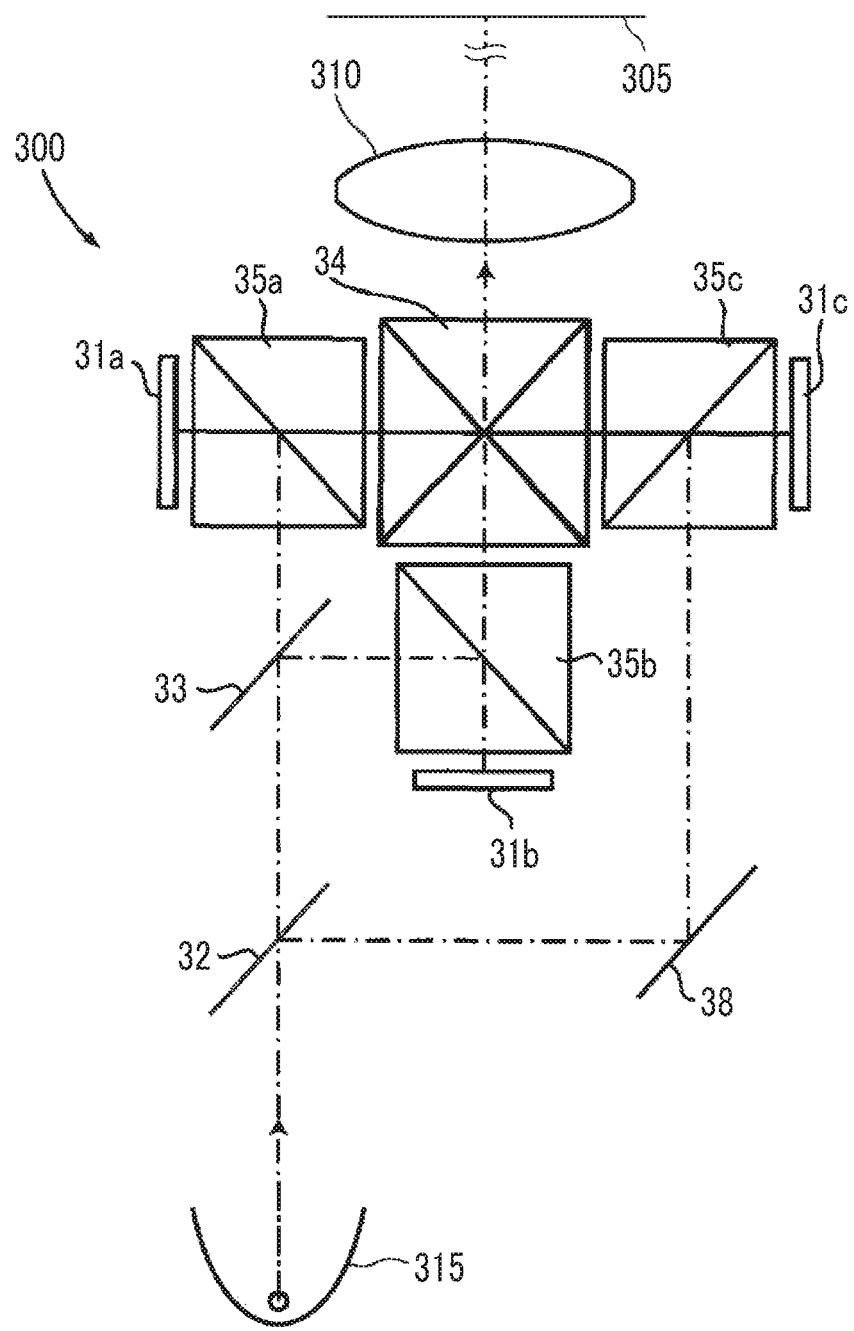
FIG. 11 is a schematic configuration diagram of a projection display device according to still another embodiment of the present invention.

FIG. 11 is a schematic configuration diagram of a projection display device according to still another embodiment of the present invention. The projection display device 300 illustrated in FIG. 11 has an imaging optical system 310 according to the above-mentioned embodiment of the present invention, a light source 315, reflective display elements 31a to 31c as light valves corresponding to respective color light rays, dichroic mirrors 32 and 33 for color separation, a cross dichroic prism 34 for color synthesis, a total reflection mirror 38 for deflecting the optical axis, and polarization separating prisms 35a to 35c. In FIG. 11, the imaging optical system 310 is schematically illustrated. Further, an integrator is disposed between the light source 315 and the dichroic mirror 32 but not illustrated in FIG. 11.

White light originated from the light source 315 is separated into rays with three colors (G light, B light, R light) through the dichroic mirrors 32 and 33. The separated rays with the respective colors respectively pass through the polarization separating prisms 35a to 35c, are incident into and optically modulated through the reflective display elements 31a to 31c respectively corresponding to the rays with the respective colors, are subjected to color synthesis through the cross dichroic prism 34, and are subsequently incident into the imaging optical system 310. The imaging optical system 310 projects an optical image, which is formed by the light optically modulated through the reflective display elements 31a to 31c, onto a screen 305.

Figure 12:
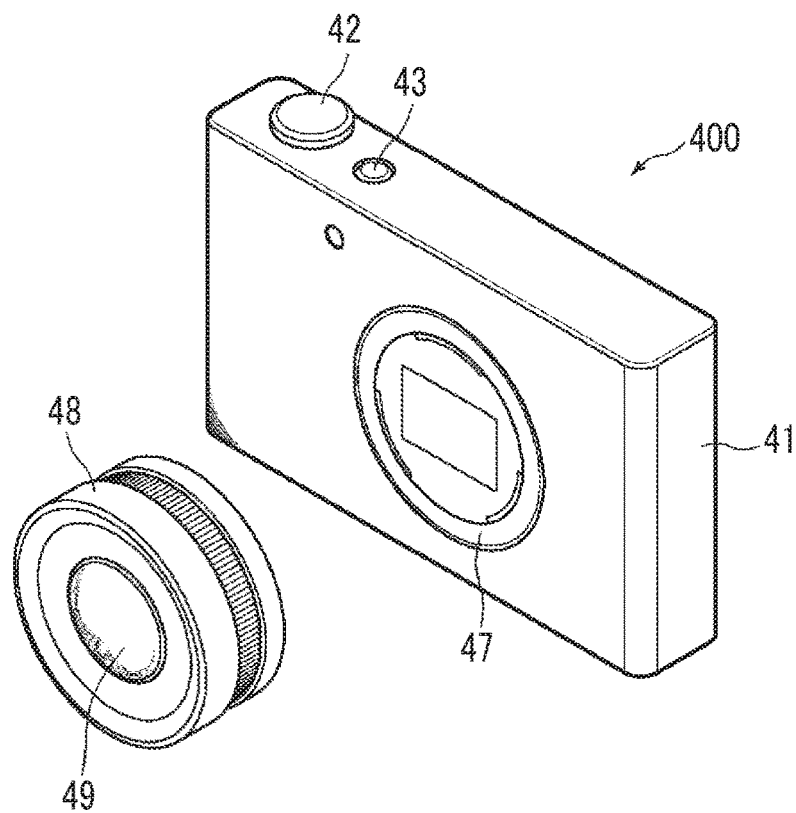
FIG. 12 is a perspective view of the front side of an imaging apparatus according to an embodiment of the present invention.
Figure 13:
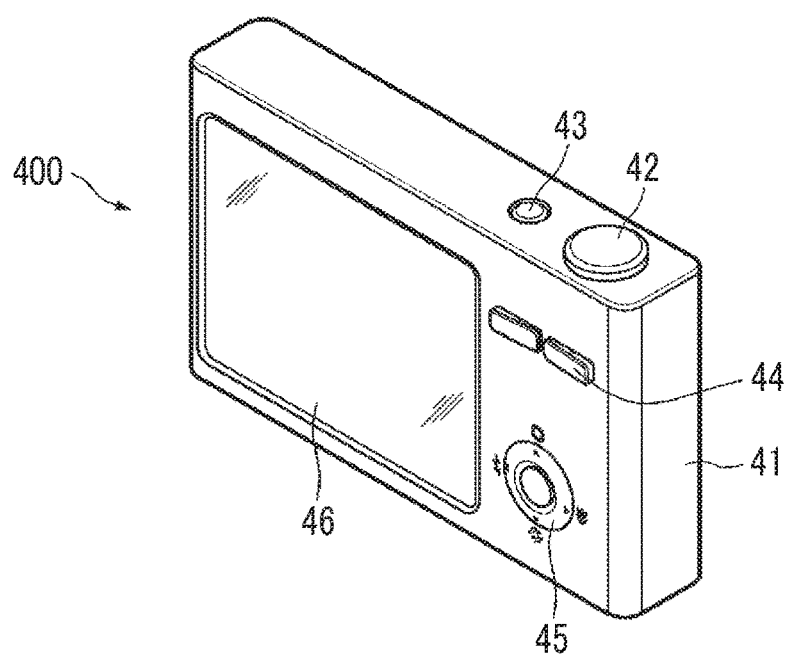
FIG. 13 is a perspective view of the rear side of the imaging apparatus illustrated in FIG. 12.

FIGS. 12 and 13 are external views of a camera 400 which is the imaging apparatus according to the above-mentioned embodiment of the present invention. FIG. 12 is a perspective view of the camera 400 viewed from the front side, and FIG. 13 is a perspective view of the camera 400 viewed from the rear side. The camera 400 is a single-lens digital camera on which an interchangeable lens 48 is detachably mounted and which has no reflex finder. The interchangeable lens 48 is configured such that an imaging optical system 49 as the optical system according to the above-mentioned embodiment of the present invention is housed in a lens barrel.

The camera 400 includes a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image and/or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a storage medium, and the like. The imaging element (not shown in the drawing) such as a charge coupled device (CCD) or a complementary metal oxide semiconductor (CMOS) outputs a captured image signal based on a subject image which is formed through the interchangeable lens 48. The signal processing circuit generates an image through the processing of the captured image signal which is output from the imaging element. The storage medium stores the generated image. The camera 400 is able to capture a still image or a moving image by pressing the shutter button 42, and is able to store image data, which is obtained through imaging, in the storage medium.

The present invention has been hitherto described through embodiments and examples, but the imaging optical system of the embodiment of the present invention is not limited to the above-mentioned embodiments and examples, and may be modified into various forms. For example, the radius of curvature, the surface distance, the refractive index, and the Abbe number of each lens may be appropriately changed. In addition, the surfaces on the magnification side and the reduction side have curvatures in the above embodiment and examples, but the surfaces on the magnification side and the reduction side are flat surfaces, and even in a case where curvature is given to two surfaces arranged near each other of two lenses, a temperature compensation effect can be obtained.

Further, the projection display device of the embodiment of the present invention is not limited to that of the above-mentioned configuration. For example, the used light valve and the optical member used in separation or synthesis of rays are not limited to those of the above-mentioned configuration, and may be modified into various forms. The light valve is not limited to a configuration in which light from a light source is spatially modulated by an image display element and output as an optical image based on image data, and may be configured to output light itself, which is output from a self-luminous image display element, as an optical image based on image data. Examples of the self-luminous image display element include an image display element in which light-emitting elements such as light emitting diodes (LED) or organic light emitting diodes (OLED) are two-dimensionally arranged.

Further, the imaging apparatus of the embodiment of the present invention is also not limited to the above-mentioned configurations. For example, the present invention may be applied to a single-lens reflex camera, a film camera, a video camera, and the like.

EXPLANATION OF REFERENCES 10, 210, 310: imaging optical system
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section
47: mount
48: interchangeable lens
49: imaging optical system
100, 200, 300: projection display device
105, 205, 305: screen
400: camera
A: on-axis rays
B: rays with maximum angle of view
L1 to L31: lens
LC1: first lens pair
LC2: second lens pair
M: intermediate image
PP: optical member
Sim: image display surface
St: aperture stop
Z: optical axis

What is claimed is:

1. An imaging optical system comprising:
a plurality of lenses, including a lens pair consisting of two lenses arranged near each other, in which radii of curvature of two surfaces arranged near each other of the two lenses is close to each other,
wherein, assuming that
among the two lenses of the lens pair, a lens with a smaller temperature coefficient of a refractive index of a lens material is a lens a and a lens with a larger temperature coefficient of a refractive index of a lens material is a lens b,
the temperature coefficient of the refractive index of the lens a at 20° C. to 40° C. is $(dNa/dT) \times 10^{-6}$,
the temperature coefficient of the refractive index of the lens b at 20° C. to 40° C. is $(dNb/dT) \times 10^{-6}$,
the refractive index of the lens a at a d line is Na,
the refractive index of the lens b at the d line is Nb,
an Abbe number of the lens a at the d line is va, and
an Abbe number of the lens b at the d line is vb,
the following Conditional Expressions (1) to (3) are satisfied.

$$2 < (dNb/dT - dNa/dT)/(Na-1) \qquad (1)$$

$$|Nb-Na| \times 10^5 < 100 \qquad (2)$$

$$|vb-va| < 0.8 \qquad (3)$$

2. The imaging optical system according to claim 1, wherein, assuming that a minimum value of a thickness in an optical axis direction in an effective diameter of the lens pair is D and a maximum value of effective radii of a surface on a magnification side and a surface on a reduction side of the lens pair is H, the following Conditional Expression (4) is satisfied.

$$0.05 < D/H \qquad (4)$$

3. The imaging optical system according to claim 2, wherein the following Conditional Expression (4-1) is satisfied.

$$0.1 < D/H < 5 \qquad (4\text{-}1)$$

4. The imaging optical system according to claim 1, wherein the imaging optical system has a zooming function, and
assuming that a maximum value of heights of paraxial rays of a surface on a magnification side and a surface on a reduction side of the lens pair at a wide-angle end is hpw, and a maximum value of heights of paraxial rays of a lens surface of the entire system at the wide-angle end is hmaxw, the following Conditional Expression (5) is satisfied.

$$0.3 < |hpw/hmaxw| \qquad (5)$$

5. The imaging optical system according to claim 4, wherein the following Conditional Expression (5-1) is satisfied.

$$0.5 < |hpw/hmaxw| < 1 \qquad (5\text{-}1)$$

6. The imaging optical system according to claim 1, wherein the imaging optical system has a zooming function, and,
assuming that a maximum value of heights of paraxial rays of a surface on a magnification side and a surface on a reduction side of the lens pair at a telephoto end is hpt, and a maximum value of heights of paraxial rays of a lens surface of the entire system at the telephoto end is hmaxt, the following Conditional Expression (6) is satisfied.

$$0.3 < |hpt/hmaxt| \qquad (6)$$

7. The imaging optical system according to claim 6, wherein the following Conditional Expression (6-1) is satisfied.

$$0.5 < |hpt/hmaxt| < 1 \qquad (6\text{-}1)$$

8. The imaging optical system according to claim 1, wherein the imaging optical system is a single focus optical system, and,
assuming that a maximum value of heights of paraxial rays of a surface on a magnification side and a surface on a reduction side of the lens pair is hp and a maximum value of heights of paraxial rays of a lens surface of the entire system is hmax, the following Conditional Expression (7) is satisfied.

$$0.3 < |hp/hmax| \qquad (7)$$

9. The imaging optical system according to claim 8, wherein the following Conditional Expression (7-1) is satisfied.

$$0.5 < |hp/hmax| < 1 \qquad (7\text{-}1)$$

10. The imaging optical system according to claim 1, wherein the number of the lens pair is two.

11. The imaging optical system according to claim 1, wherein the following Conditional Expression (1-1) is satisfied.

$$4 < (dNb/dT - dNa/dT)/(Na-1) < 20 \qquad (1\text{-}1)$$

12. The imaging optical system according to claim 1, wherein the following Conditional Expression (2-1) is satisfied.

$$0 \le |Nb - Na| \times 10^5 < 50 \qquad (2\text{-}1)$$

13. The imaging optical system according to claim 1, wherein the following Conditional Expression (3-1) is satisfied.

$$0 \le |vb - va| < 0.5 \qquad (3\text{-}1)$$

14. A projection display device comprising:
a light valve that outputs an optical image based on image data; and
the imaging optical system according to claim 1, wherein the imaging optical system projects the optical image output from the light valve on a screen.

15. An imaging apparatus comprising the imaging optical system according to claim 1.

* * * * *